Jan. 31, 1956  J. W. PARKS  2,732,764
REARVIEW MIRROR
Filed June 20, 1952
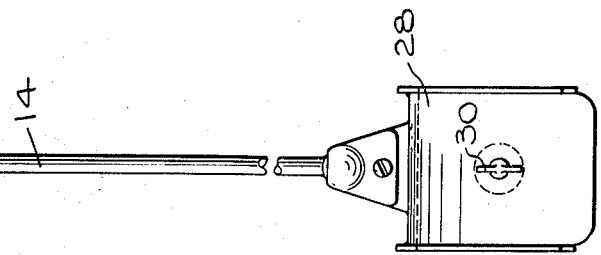
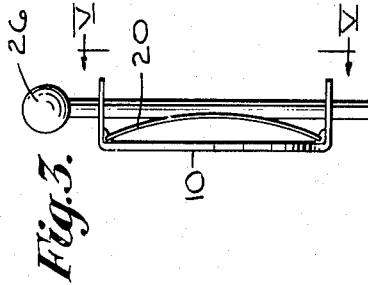
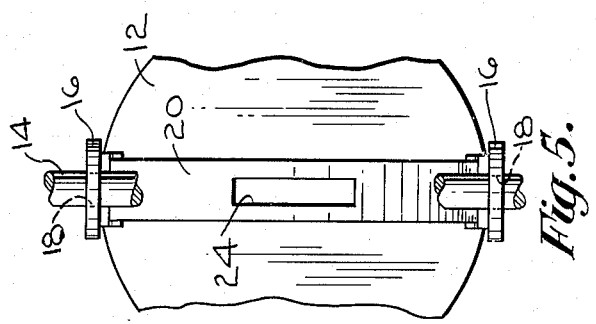
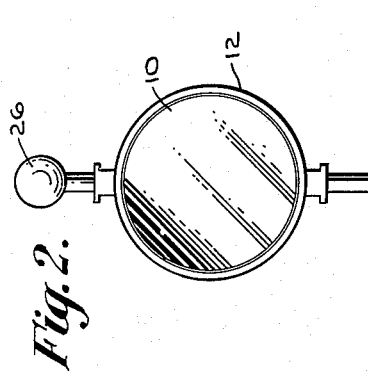
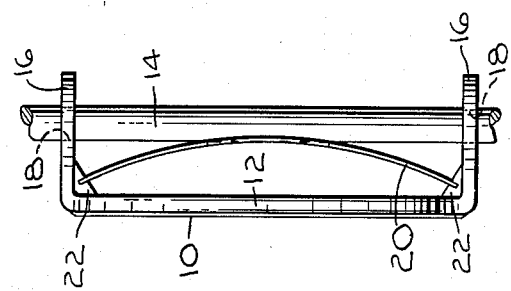
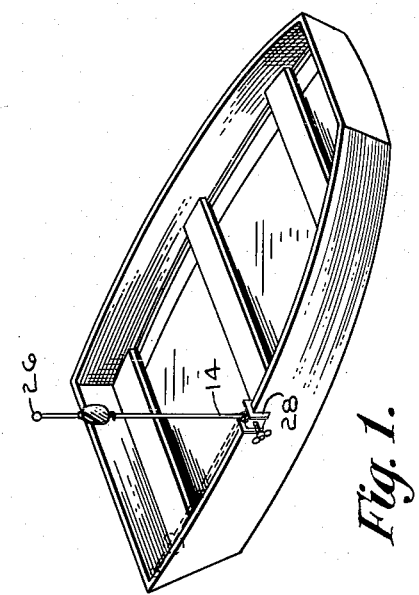
INVENTOR.
Joseph W. Parks
BY
Douglas R. Scott
HIS ATTORNEY

United States Patent Office 2,732,764
Patented Jan. 31, 1956

2,732,764
REARVIEW MIRROR

Joseph W. Parks, Altoona, Pa.

Application June 20, 1952, Serial No. 294,590

2 Claims. (Cl. 88—98)

This invention relates to rear-view mirrors and more particularly to adjustable supporting means therefor. A principal object of this invention is the provision of new and improved apparatus of this type.

In the past, adjustable mirror supports have usually included a plurality of telescoped elements. Such supports are subject to the disadvantage when used under extremely moist conditions in that moisture tends to collect between adjacent surfaces of the telescoped elements inducing rusting and eventual seizing thereof. This invention contemplates the provision of a support for mirrors particularly adapted for use under extremely moist conditions as for example for use with a rowboat or the like. To this end, the adjustable mirror support of this invention has the working parts thereof exposed to the atmosphere at all times so that moisture deposited thereon will quickly evaporate and the foregoing disadvantages are thereby overcome.

It is an object of this invention to provide a mirror which has particular utility when applied to a conveyance such as a boat or the like.

Another object of this invention is to provide a rear-view mirror support which is simple, sturdy, and easily adjusted.

Other objects and advantages will appear from the following specification taken in connection with the accompanying drawings wherein:

Fig. 1 is a perspective view of a rear-view mirror embodying this invention and shown as applied to a boat;

Fig. 2 is a front elevation of the rear-view mirror shown in Fig. 1;

Fig. 3 is a side elevation of the rear-view mirror shown in Fig. 1;

Fig. 4 is a fragmentary view of the apparatus as shown in Fig. 3 on an enlarged scale; and Fig. 5 is a fragmentary view taken on the line V—V of Fig. 3 with a portion broken away and shown on an enlarged scale.

Referring more particularly to the drawing, a mirror 10 is shown as securely mounted in a back-up plate 12, the peripheral portion of the back-up plate 12 being crimped over the outer edge of the mirror 10 in a manner well known in the art. The assembly of the mirror 10 and back-up plate 12 is mounted upon a rod or shaft 14 to be slidable thereon and rotatable relative thereto. To this end a pair of spaced lugs 16 having apertures 18 formed therein are secured to the back-up plate 12. The lugs 16 are disposed substantially normal to the back-up plate 12 with the apertures therein in alignment to loosely receive the shaft 14.

To restrain the assembly of the mirror 10 and back-up plate 12 from slidable and rotational movement relative to the shaft 14, yieldable means acting between such assembly and the shaft 14 are employed to urge the lugs 16 into snug engagement with the shaft 14 along a portion of the edges of the apertures 18 formed therein. This means is here shown as comprising a leaf spring 20. Each end of the spring 20 is preferably bifurcated and adapted to straddle a gusset secured to the back-up plate 12 and the lugs 16 at the junctures thereof. The gussets 22 thus serve to reinforce the lugs 16 and prevent lateral displacement of the spring 20.

The spring 20 is of such length that it will be bowed toward the shaft 14 when it is inserted between the gussets 22. An elongated aperature 24 formed in the medial portion of the spring 20 is adapted to receive a portion of the shaft 14 to further prevent lateral movement of the spring 20. It will be apparent that the spring 20, acting between the shaft 14 and the gussets 22, will serve to bias the assembly of the mirror 10 and back-up plate 12 to the left as viewed in Fig. 4 so that the shaft 14 is in effect resiliently clamped between the spring 20 and the lugs 16.

The bias of the spring 20 is preferably great enough to preclude relative movement between the mirror 10 and the shaft 14 under normal conditions but small enough to yield under manual manipulation of the mirror to permit a user to position the mirror 10 in any desired location longitudinally or circumferentially of the shaft 14.

Since the mirror assembly is slidable of the shaft 14, abutment means is provided for preventing accidental removal thereof from the shaft. To this end, a spherical element 26 is secured to one end of the shaft 14 by any suitable means and may be threaded thereon. It is to be noted that the spherical element 26 not only serves to provide a stop for the mirror assembly but also provides a safety feature in that it precludes the possibility of a user's being accidentally impaled or otherwise injured by the projecting end of the shaft 14.

That end of the shaft 14 opposite the end on which is mounted the spherical element 26 is pivotally connected to a suitable clamping device here shown as a C-clamp 28. The C-clamp 28 has the usual set screw 30 which may be adjusted to secure the mirror mounting to a conveyance. Fig. 1 is illustrative of one application and shows the C-clamp secured to the gunwale of a boat.

It will be apparent from the foregoing that a relatively open mirror supporting structure has been provided so that collection and retention of moisture between relatively movable parts is precluded. It will also be apparent that a mirror supporting structure has been provided which is quickly and easily adjustable to suit the physical make-up and/or the desires of a user. Furthermore, the disclosed embodiment of the invention provides a new and improved rear-view mirror and accordingly accomplishes the objects of the invention.

Although the disclosed embodiment of this invention has been described in considerable detail, it is to be understood that such description is intended as illustrative rather than limiting as the invention may be variously embodied and is to be interpreted as claimed.

It is claimed and desired to secure by Letters Patent:

1. A rear-view mirror comprising a clamping element adapted to be secured to a conveyance, a shaft pivoted on said element, a mirror, a backing plate secured to said mirror, a pair of spaced lugs extending from said plate, said lugs having aligned apertures formed therein, a gusset centrally located on each lug, said shaft extending slidably through said apertures, a leaf spring having bifurcated ends and disposed between said shaft and said plate with said ends thereof straddling said gussets, the medial portion of said spring being bowed into frictional engagement with said shaft to bias said backing plate away from said shaft and yieldably resist slidable and rotational movement of the assembly of said mirror and said backing plate relative to said shaft.

2. The combination claimed in claim 1 wherein said medial portion of said spring is provided with an aperture, the edges of said aperture engaging said shaft.

References Cited in the file of this patent

UNITED STATES PATENTS

| | | |
|---|---|---|
| 564,454 | Ryan | July 21, 1896 |
| 795,602 | Fyfe | July 25, 1905 |
| 1,311,278 | Holdsworth | July 29, 1919 |
| 1,521,508 | Denoux | Dec. 30, 1924 |
| 2,573,443 | Holland | Oct. 30, 1951 |

FOREIGN PATENTS

| | | |
|---|---|---|
| 170,147 | Great Britain | Oct. 20, 1921 |
| 234,548 | Great Britain | May 28, 1925 |
| 455,381 | Great Britain | Oct. 20, 1926 |